UNITED STATES PATENT OFFICE.

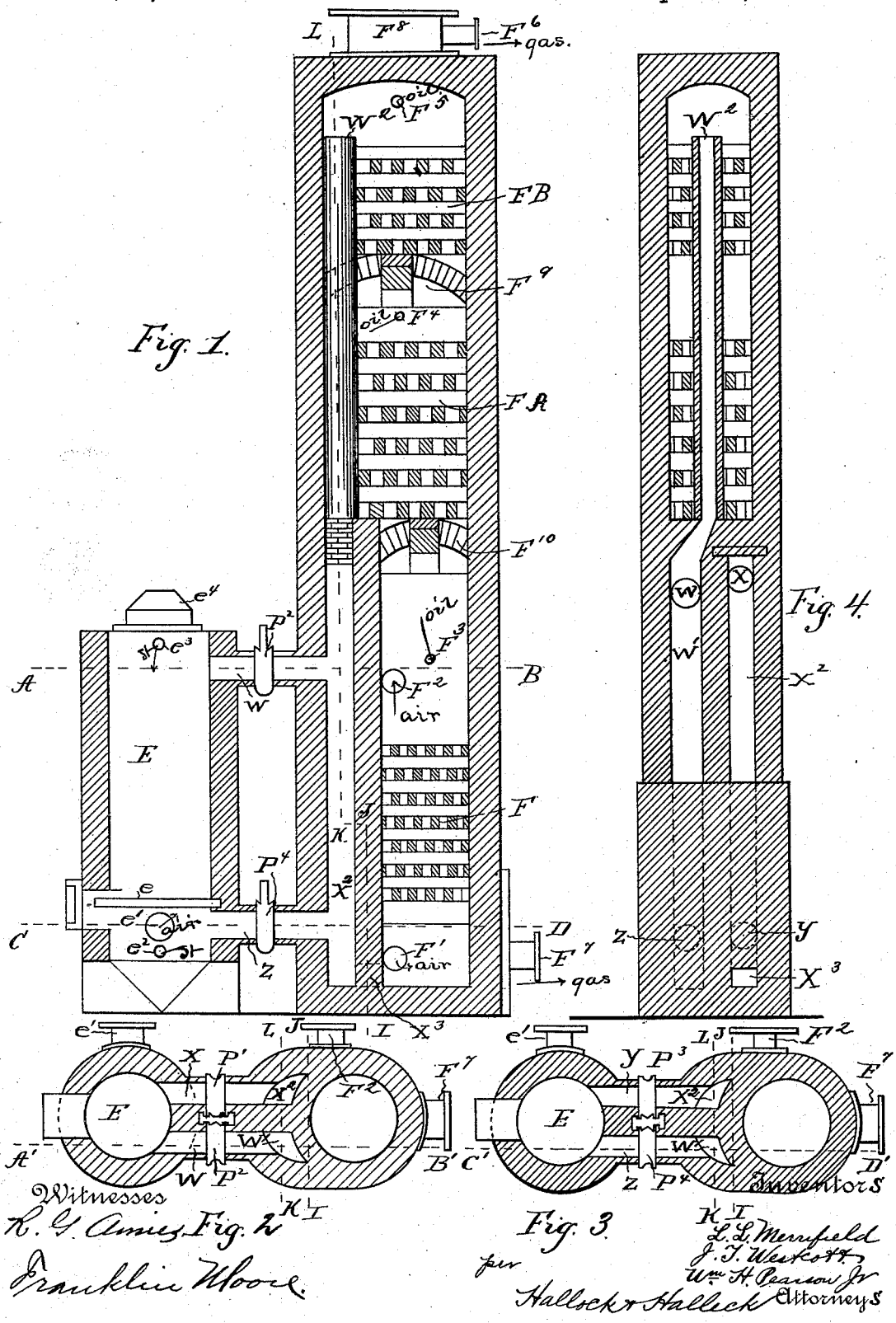

LEONARD LANCASTER MERRIFIELD, OF FRANKLIN, MASSACHUSETTS, JOHN TOWNSEND WESTCOTT, OF CRAMER'S HILL, NEW JERSEY, AND WILLIAM HENRY PEARSON, JR., OF TORONTO, CANADA.

APPARATUS FOR MANUFACTURING GAS.

SPECIFICATION forming part of Letters Patent No. 505,714, dated September 26, 1893.

Application filed March 25, 1893. Serial No. 467,552. (No model.)

*To all whom it may concern:*

Be it known that we, LEONARD LANCASTER MERRIFIELD, residing at Franklin, county of Norfolk, State of Massachusetts, and JOHN TOWNSEND WESTCOTT, residing at Cramer's Hill, county of Camden, New Jersey, citizens of the United States, and WILLIAM HENRY PEARSON, Jr., a subject of the Queen of Great Britain, residing at the city of Toronto, county of York, Province of Ontario, Canada, have invented a new and useful Improved Apparatus for Manufacturing Gas, of which the following is a true and exact description, reference being had to the accompanying drawings, which form a part of this specification, and in which—

Figure 1 is an elevation in section taken on line A' B' of Fig. 2—and C' D' of Fig. 3—of a water gas apparatus embodying our improvement. Fig. 2 is a cross section on line A. B. Fig. 1. Fig. 3 is a cross section on line C. D. Fig. 1. Fig. 4 is an elevation on lines I. J and K. L. Figs. 1, 2 and 3.

Our invention relates to the construction of apparatus for the manufacture of water gas and consists of combinations and constructions all as will hereinafter be set forth in the specification and pointed out in the claim.

Referring to the drawings—E represents a generator provided with the usual grate $e$ to support the fuel, $e'$ an air blast conduit in the lower part of the generator, $e^2$ a steam inlet at bottom of generator, $e^3$ a steam inlet at top of generator, and $e^4$ a fuel inlet in the top of the generator. X and W are two outlets at top of generator, Y and Z are two outlets at bottom of generator. Each of these outlets X, Y, W, and Z are provided with valves P', $P^2$, $P^3$, $P^4$.

X is a combustion fuel also used as a gas exit flue and having its rear or exit end opening into a vertical flue $X^2$ in the wall of the superheaters. The upper end of flue $X^2$ is closed and the lower end is connected with the transverse flue $X^3$ that leads into the base of the superheating or fixing chambers.

W is a gas exit flue connecting with a vertical flue W' which extends from the bottom to the top of the shell of the superheating or fixing chambers.

Y is a gas exit flue connected with the flue $X^2$.

Z is a gas exit flue connected with the flue W'.

F, F A, and F B are superheating or fixing chambers containing refractory material placed in the form of checker work in the usual manner. It will be noted that the products of combustion do not directly enter the superheating or fixing chambers from the flues leading from the generator but first enter the vertical flues W' and $X^2$ and then into the superheaters or fixing chambers. One of the objects in providing said vertical flues is to catch the dust and cinders before they can enter the superheater or fixing chambers and thereby avoid deposition of the dust and cinders upon the checker work and the subsequent clogging of the open work of the latter as has been the case when the dust and cinders have not been intercepted before entering the superheating or fixing chamber. The dust and cinders so arrested fall to the bottom of the flues from whence they are removed through suitably closed openings (not shown) at the bottom of the flues.

The superheating or fixing chambers F, F A, and F B, are contained in one single shell and are separated from one another by divisional arches, $F^9$ and $F^{10}$ having openings therein for the passage of the products of combustion from one chamber to the other. Below and above the checker work in chamber F are located respectively the openings of the air blast conduits F' and $F^2$. In each of the chambers are located the exit openings of oil supplying pipes—pipe $F^3$ being in chamber F, pipe $F^4$ in chamber F A, and pipe $F^5$ in chamber F B.

$F^6$ and $F^7$ are outlets for conveying the gas from the superheaters or fixing chambers to other parts of the works and they or their pipe connections are provided with suitable valves (not shown) so that the gas, when occasion requires, can be diverted through one or the other of the outlets. Outlet $F^6$ is placed at the top and outlet $F^7$ at the bottom of the superheaters or fixing chambers so that they can be used in conjunction with the flues W' and $X^2$. When the flue $X^2$ is used, outlet $F^7$ is closed and the products of combustion are passed upward through the superheater or fixing chamber and through outlet $F^6$ and when flue $W'$ is used, outlet $F^6$ is closed and the products of combustion are passed downward through the superheating or fixing chambers and through outlet $F^7$ for purposes hereinafter to be described. In the upper part of the superheater is an outlet pipe $F^8$ having a valve (not shown) which when opened allows the products of combustion to escape to the smoke stack for a purpose to be hereinafter described.

The operation of this apparatus is as follows. The fuel is introduced into the generator through the opening $e^4$, the air blast is then introduced through opening $e'$, and is forced through the fuel. The producer gas thus formed is allowed to pass through the conduit X, $X^2$ and $X^3$ to the superheaters or fixing chambers. Air is admitted through conduits $F'$ and $F^2$ into said chambers, combustion is effected, and the chambers are heated. The products of combustion are allowed to escape through the valve in the top of pipe $F^8$ into the stack. When the fuel in the generator is sufficiently ignited and the refractory material in the superheaters and fixing chambers is sufficiently heated all the air blasts are shut off and the valve in pipe $F^8$ closed. Steam is then turned into the bottom of generator through pipe $e^2$, and passing through the ignited fuel is converted into water gas. The valves $P^2$, $P^3$, and $P^4$ having previously been closed, the water gas passes from the generator through the conduits X, $X^2$, and $X^3$ into the bottom of the superheater or fixing chamber F where it becomes highly superheated by passing through the refractory material with which the chamber is filled. Hydrocarbon vapors or liquids are then introduced through pipe $F^3$ into the chamber F where they are instantly vaporized and diffused with the highly superheated water gas. Both gases then pass on through openings in arches $F^9$ and $F^{10}$ into chambers F A and F B, where the hydrocarbon vapors are gasified and fixed with the water gas, and which then pass on through the pipe or opening $F^6$ to the washers, scrubbers, condensers and purifiers. When the heat in the generator ceases to decompose the steam, the hydrocarbons and steam are then shut off, and the valve at outlet pipe $F^8$ opened, the air blast is then turned on at points $e'$, $F'$ and $F^2$, and the temperatures are raised as before described, and when the heats are sufficiently increased to again decompose the steam, the air blasts $e'$, $F'$ and $F^2$ are shut, valve $P^4$ is opened and valve $P'$ is closed, and then outlet valve in outlet $F^8$ is closed. Steam is then introduced into the generator through pipe $e^3$ and which, passing down through the fuel, is converted into water gas. The water gas passes from the generator through the conduit Z into the conduit $W'$, passes out at exit $W^2$, into the chamber F B, where it becomes highly heated by passing down through the heated refractory material with which the chamber is filled. Hydrocarbon vapors or liquids are then introduced into the chamber F A through the pipe $F^4$ where they are instantly vaporized and diffused with the highly supeaheated water gas, then both gases pass on through the chambers F A and F where the hydrocarbon vapors are gasified and fixed with the water gas, and they then pass on through the outlet or opening $F^7$ into the washers, scrubbers, condensers and purifiers. When the heat in the generator ceases to decompose the steam, the hydrocarbons and the steam are then shut off, the valve in the outlet pipe $F^8$ is opened. Valve $P'$ is also opened, and valve $P^4$ is closed. If at this time, or at any other time, it is found necessary to replenish the fuel in the generator, it is done by introducing it through opening $e^4$. Opening $e^4$ being closed the air blast is again introduced through the openings $e'$, $F'$ and $F^2$, and the temperatures raised as before described. When the temperature is sufficiently increased to again decompose steam, the valves of air blasts $e'$, $F'$ and $F^2$ are closed. The valve $P^2$ is now opened, and valve $P'$ in flue X and in the outlet pipe $F^8$ are closed. Steam is introduced through pipe $e^2$ and passing through the fuel is converted into water gas. The water gas passes from the generator through the conduit W into flue $W'$ passes out at the exit $W^2$ into the chamber F B, where it becomes highly heated by passing down through the heated refractory material with which the chamber is filled. Hydrocarbon vapors or liquids are then introduced into the chamber F A through the pipe $F^4$ where they are instantly vaporized and diffused with the highly superheated water gas. Both gases then pass on through the chambers F A and F where the hydrocarbon vapors or liquids are gasified and fixed with the water gas, and through the opening $F^7$ into the washers, scrubbers, condensers and purifiers. When the heat in the generator ceases to decompose the steam, the hydrocarbons and the steam are then shut off, and the valve in the outlet $F^8$ and valve $P'$ are opened, and the valve $P^2$ is closed. The temperatures raised as before described, until the heat being enough to decompose the steam, the air valves $e'$, $F'$ and $F^2$ are closed, and valve $P^3$ is opened, valve $P'$ and the valve at outlet $F^8$ are then closed. Steam is now admitted through pipe $e^3$ and passing through the fuel is converted into water gas. The water gas passes from the generator through the conduit Y into conduits $X^2$ and $X^3$ into the bottom of the superheater or fixing chamber F where it becomes highly superheated by passing through the refractory material. Hydrocarbon vapors or liquids are then introduced into the chamber through pipe $F^3$ where they are instantly vaporized and diffused with the highly superheated water gas. Both gases then pass on through the chambers F A and F B where the hydrocarbon vapors are gasified and fixed with the water gas, and through outlet F⁶ to the washers, scrubbers, condensers and purifiers.

We do not limit our apparatus to be always operated in the exact order in which we have described it.

The changes may be varied as may be found most convenient at the discretion and judgment of the operator.

By providing four passages to connect the generator and the superheater and two gas outlets in the superheater and at opposite ends, the apparatus may be utilized to obtain the best results in making gas. Some of the operations will now be described.

Steam may be forced down through the fuel in the generator and the resultant water gas made to pass up from the bottom of the superheater to the top, or down from top to bottom. This requires two connections from generator to superheater. Steam may also be forced up through the fuel in the generator and the resultant water gas made to pass up from the bottom of the superheater to the top, or down from top to bottom. This requires other two connections, making four in all. In actual work it is found of very great advantage to be able at any moment to reverse the direction of the flow of gas through the superheater, because when the current has been continued for some time in one direction it is found that the part where the gas enters becomes of too low a temperature and the other end of too high a temperature for proper gas making, and by changing the direction of the current, the temperature is again made more uniform. When the temperature of any portion of the superheater chamber becomes too high the hydro-carbons or oils form lamp-black and when too low a temperature is formed in any part tar is deposited. It is possible to have tar, gas and lamp-black all being produced at the same time in different parts of the superheating chambers. By having the double arrangement of ducts from top and bottom of generator, and apparatus arranged for reversing direction of currents, the attendant may reverse the current in the generator without changing that in the superheater, and may change the currents in the seperheater without changing that in the generator. By frequently changing the current through the superheater a much more uniform temperature is maintained throughout the whole of the superheating chamber, and thereby a better and more uniform quality of gas is produced with much less waste of oil and with a saving in fuel.

Having now described our invention and the construction and operation of our apparatus for carrying into effect our new process, what we claim as our invention, and desire to secure by Letters Patent, is—

In an apparatus for making carbureted gas, the combination with a superheating chamber having a smoke exit, two sets of valve controlled inlets and outlets in the top and bottom of said chamber, the inlet at the top being paired with the outlet at the bottom and the inlet at the bottom being paired with the outlet at the top; of a generator having two openings one in the top and the other in the bottom for the alternate admission of steam and provided with a flue connection with the inlet at the top and a flue connection with the inlet at the bottom of said chamber, substantially as described.

In testimony whereof we affix our signatures in the presence of two witnesses.

LEONARD LANCASTER MERRIFIELD.
  JOHN TOWNSEND WESTCOTT.
  WILLIAM HENRY PEARSON, Jr.

Witnesses:
 FRANKLIN METCALF McDOWELL,
 ROBERT AMBROSE STATON.